US012384955B2

(12) United States Patent
Northrop et al.

(10) Patent No.: US 12,384,955 B2
(45) Date of Patent: Aug. 12, 2025

(54) REGENERATING SOLVENT MIXTURES THAT ARE USED FOR ELEMENTAL SULFUR REMOVAL WITHIN HYDROCARBON WELLS

(71) Applicant: ExxonMobil Technology and Engineering Company, Spring, TX (US)

(72) Inventors: P. Scott Northrop, Spring, TX (US); Kevin A. Harnsberry, Beaumont, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 210 days.

(21) Appl. No.: 18/549,334

(22) PCT Filed: Mar. 16, 2022

(86) PCT No.: PCT/US2022/020495
§ 371 (c)(1),
(2) Date: Sep. 6, 2023

(87) PCT Pub. No.: WO2022/203912
PCT Pub. Date: Sep. 29, 2022

(65) Prior Publication Data
US 2024/0174912 A1 May 30, 2024

Related U.S. Application Data

(60) Provisional application No. 63/166,379, filed on Mar. 26, 2021.

(51) Int. Cl.
*C09K 8/532* (2006.01)
*C09K 8/536* (2006.01)
*E21B 37/06* (2006.01)

(52) U.S. Cl.
CPC ............. *C09K 8/536* (2013.01); *C09K 8/532* (2013.01); *E21B 37/06* (2013.01)

(58) Field of Classification Search
None
See application file for complete search history.

(56) References Cited

U.S. PATENT DOCUMENTS

| 4,020,144 A * | 4/1977 | Bosniack ........... B01D 53/1493 95/232 |
| 2013/0343978 A1 | 12/2013 | Ballaguet et al. |
| 2020/0002599 A1 | 1/2020 | Northrop et al. |

FOREIGN PATENT DOCUMENTS

| CA | 1060182 A | 8/1979 |
| TW | 200914107 A | 4/2009 |

OTHER PUBLICATIONS

Written Opinion and International Search Report from parent PCT Application No. PCT/US2022/020495 mailed Jun. 24, 2022.

* cited by examiner

*Primary Examiner* — Andrew Sue-Ako
(74) *Attorney, Agent, or Firm* — Vorys, Sater, Seymour and Pease LLP (57) ABSTRACT

Methods for utilizing and regenerating solvent mixtures for dissolving elemental sulfur within hydrocarbon wells are described herein. One method includes providing a solvent mixture including an elemental sulfur solvent fraction including disulfide compound(s), as well as an odorant fraction including a lactate ester solvent. The method also includes injecting the solvent mixture into a hydrocarbon well such that the elemental sulfur solvent fraction dissolves elemental sulfur deposited on well components, as well as collecting the resulting spent solvent mixture, which includes thiols and residual lactate ester solvent, within a spent solvent separator. The method further includes sparg- (Continued)

ing the spent solvent mixture with oxidizer within the spent solvent separator to allow for oxidation of the thiols to produce the disulfide compound(s) using the residual lactate ester solvent (and, optionally, additional lactate ester solvent), as well as regenerating the solvent mixture using at least a portion of the produced disulfide compound(s).

20 Claims, 2 Drawing Sheets

REGENERATING SOLVENT MIXTURES THAT ARE USED FOR ELEMENTAL SULFUR REMOVAL WITHIN HYDROCARBON WELLS

FIELD

The techniques described herein relate to the field of well completions and downhole operations. More particularly, the techniques described herein relate to regenerating solvent mixtures that are used for elemental sulfur removal within hydrocarbon wells.

BACKGROUND

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Elemental sulfur deposition in production wells and gathering facilities can be an issue for certain sour gas reservoirs. Elemental sulfur is soluble in sour gas, i.e., gas containing acid gases such as hydrogen sulfide ($H_2S$) and carbon dioxide ($CO_2$), and the solubility of the elemental sulfur increases with increasing temperature, pressure, $H_2S$ content, and $CO_2$ content. In the production of sour gas reservoirs containing dissolved elemental sulfur, problems have been encountered due to the deposition of the elemental sulfur downhole. As the gas from the reservoir is produced by the well, the temperature and pressure of the gas gradually decrease. This causes some amount of the elemental sulfur to drop out of the gas and deposit on the walls of the production tubing within the well. Such sulfur deposition can restrict the flow path of the gas through the tubing. In severe cases, the tubing may be entirely plugged by the sulfur deposits, causing the well to become non-operational.

Historically, diaryl disulfide (DADS)-based solvents have been utilized to dissolve elemental sulfur and remove the elemental sulfur from well components. Such DADS-based solvents are effective at removing elemental sulfur and do not exhibit an extremely unpleasant odor. However, DADS-based solvents have become difficult to obtain and/or utilize.

Dimethyl disulfide (DMDS)-based solvents are also effective at dissolving elemental sulfur and removing the elemental sulfur from well components. However, DMDS-based solvents are extremely malodorous. Even small releases of DMDS-based solvents may create large volumes of foul-smelling air. Thus, it may be impractical, or impermissible, to apply DMDS-based solvents in many situations.

Furthermore, for downhole applications, formation permeability must be considered when deciding how to mitigate sulfur deposition. Specifically, any solvent that is used for dissolving elemental sulfur within a well should not adversely affect the permeability of the producing formation, since that would compromise the productivity of the well. Therefore, there exists a need for improved solvent mixtures that may be used to dissolve elemental sulfur within a wellbore, while also maintaining or improving the permeability of the formation through which the wellbore extends. In addition, there is a need for improved methods for handling such solvent mixtures in a manner that allows the solvent mixtures to be effectively recycled and reused.

SUMMARY

An embodiment described herein provides a method for utilizing and regenerating a solvent mixture for dissolving elemental sulfur within a hydrocarbon well. The method includes providing a solvent mixture, where the solvent mixture includes an elemental sulfur solvent fraction including at least one elemental sulfur solvent, where the at least one elemental sulfur solvent includes at least one disulfide compound, and an odorant fraction including at least one odorant, where the at least one odorant includes at least 20 wt % and at most 70 wt % of a lactate ester solvent. The elemental sulfur solvent fraction forms at least 20 wt % and at most 80 wt % of the solvent mixture, and the odorant fraction forms at least 20 wt % and at most 80 wt % of the solvent mixture. The method also includes injecting the solvent mixture into a hydrocarbon well such that the elemental sulfur solvent fraction of the solvent mixture dissolves elemental sulfur deposited on well components, as well as collecting the resulting spent solvent mixture, which includes thiols and residual lactate ester solvent, within a spent solvent separator. The method further includes sparging the spent solvent mixture with oxidizer within the spent solvent separator to allow for oxidation of the thiols to produce the at least one disulfide compound using the residual lactate ester solvent, as well as regenerating the solvent mixture using at least a portion of the at least one disulfide compound produced within the spent solvent separator.

In various embodiments, the spent solvent mixture is also contacted with additional lactate ester solvent within the spent solvent separator to further the oxidation of the thiols to produce the at least one disulfide compound. In various embodiments, the temperature of the spent solvent mixture within the spent solvent separator is increased to at least 120° F. and at most 200° F. to further the oxidation of the thiols to produce the at least one disulfide compound. Moreover, in some embodiments, the spent solvent separator is insulated and heat traced to maintain the temperature of the spent solvent mixture within the spent solvent separator.

In various embodiments, the spent solvent mixture is sparged with the oxidizer within the spent solvent separator for a time period of at least 1 hour and at most 4 hours to allow for the oxidation of the thiols to produce the at least one disulfide compound. In addition, in various embodiments, the spent solvent mixture is sparged with the oxidizer within the spent solvent separator at a relatively slow oxidizer injection rate of at least 0.1 meters per second (m/s) and at most 2.0 m/s. Furthermore, in some embodiments, the spent solvent separator is utilized to maintain an injection temperature of the solvent mixture at a relatively high injection temperature of at least 120° F. and at most 200° F., and the solvent mixture is injected into the hydrocarbon well in batches with a shorter injection time for each batch, where the shorter injection time is enabled by the relatively high injection temperature of the solvent mixture.

In some embodiments, providing the solvent mixture includes combining the elemental sulfur solvent fraction with the odorant fraction; where the elemental sulfur solvent fraction includes a solvent odor and a solvent sulfur solubility of at least 10 weight percent (wt %) at standard temperature and pressure (STP), and the odorant fraction includes an odorant odor that differs from the solvent odor; and where the presence of the odorant fraction within the solvent mixture decreases at least one of an intensity or an offensiveness of a mixture odor of the solvent mixture relative to the solvent odor. In some embodiments, providing the solvent mixture also includes adding at least 5 wt % and at most 20 wt % water directly to the solvent mixture. Moreover, in various embodiments, the lactate ester solvent includes at least one of ethyl lactate or methyl lactate, and the at least one disulfide compound includes at least one of dimethyl disulfide (DMDS), diaryl disulfide (DRDS), or carbon disulfide ($CS_2$). Moreover, in various embodiments, providing the solvent mixture comprises at least one of: (1) adding at least 5 wt % and at most 15 wt % of methyldiethanolamine (MDEA) to the odorant fraction; (2) adding at least one of methanol, isopropanol, diethanolamine (DEA), acetone, toluene, or an organic elemental sulfur solvent to the elemental sulfur solvent fraction in addition to the at least one disulfide compound; (3) adding at least 3 wt % and at most 22 wt % of an amine to the odorant fraction, where the amine includes at least one of monoethanolamine (MEA), diethanolamine (DEA), triethanolamine (TEA), or methyldiethanolamine (MDEA); or (4) adding at least 5 wt % and at most 30 wt % of a ketone to the odorant fraction, where the ketone includes at least one of di-isobutyl ketone, acetone, or methyl ethyl ketone (MEK).

Another embodiment described herein provides a method for utilizing and regenerating a solvent mixture for dissolving elemental sulfur within a hydrocarbon well and stimulating a formation through which the hydrocarbon well extends. The method includes providing a solvent mixture, where the solvent mixture includes an elemental sulfur solvent fraction including at least one elemental sulfur solvent, where the at least one elemental sulfur solvent includes dimethyl disulfide (DMDS), and an odorant fraction including at least one odorant, where the at least one odorant includes at least 20 wt % and at most 70 wt % of a lactate ester solvent. The elemental sulfur solvent fraction forms at least 20 wt % and at most 80 wt % of the solvent mixture, and the odorant fraction forms at least 20 wt % and at most 80 wt % of the solvent mixture. The method includes injecting the solvent mixture into a hydrocarbon well such that the elemental sulfur solvent fraction of the solvent mixture dissolves elemental sulfur deposited on well components, contacting the solvent mixture with water such that the lactate ester solvent within the odorant fraction reacts with the water to generate lactic acid, and stimulating a formation through which the hydrocarbon well extends by flowing the solvent mixture including the lactic acid through the hydrocarbon well and into the formation. The method also includes collecting the resulting spent solvent mixture, which includes thiols and residual lactate ester solvent, within a spent solvent separator, increasing the temperature of the spent solvent mixture within the spent solvent separator to at least 120° F. and at most 200° F., and introducing an oxidizer into the spent solvent separator. The method further includes sparging the spent solvent mixture with the oxidizer within the spent solvent separator at an oxidizer injection rate of at least 0.1 meters per second (m/s) and at most 2.0 m/s to allow for oxidation of the thiols to produce DMDS using the residual lactate ester solvent, as well as regenerating the solvent mixture using at least a portion of the DMDS produced within the spent solvent separator.

In various embodiments, additional lactate ester solvent is also introduced into the spent solvent separator to further the oxidation of the thiols to produce the DMDS. In some embodiments, the temperature of the spent solvent mixture is increased using one or more stainless-steel solvent heating coils within the spent solvent separator.

In some embodiments, the spent solvent mixture is sparged with the oxidizer within the spent solvent separator for a time period of at least 1 hour and at most 4 hours to allow for the oxidation of the thiols to produce the DMDS. In addition, in some embodiments, the spent solvent separator is utilized to maintain an injection temperature of the solvent mixture at a relatively high injection temperature of at least 120° F. and at most 200° F., and the solvent mixture is injected into the hydrocarbon well in batches with a shorter injection time for each batch, where the shorter injection time is enabled by the relatively high injection temperature of the solvent mixture. Moreover, in some embodiments, the spent solvent separator is insulated and heat traced to maintain the temperature of the spent solvent mixture within the spent solvent separator.

In various embodiments, contacting the solvent mixture with the water includes at least one of: (1) adding at least 5 wt % and at most 20 wt % water directly to the solvent mixture and allowing the water within the solvent mixture to react with the lactate ester solvent within the solvent mixture to generate the lactic acid; or (2) allowing produced water flowing through the hydrocarbon well to react with the lactate ester solvent within the solvent mixture to generate the lactic acid. In various embodiments, the lactate ester solvent includes at least one of ethyl lactate or methyl lactate. Moreover, in various embodiments, providing the solvent mixture comprises at least one of: (1) adding at least 5 wt % and at most 15 wt % of methyldiethanolamine (MDEA) to the odorant fraction; (2) adding at least one of methanol, isopropanol, diethanolamine (DEA), acetone, toluene, or an organic elemental sulfur solvent to the elemental sulfur solvent fraction in addition to the DMDS; (3) adding at least 3 wt % and at most 22 wt % of an amine to the odorant fraction, where the amine includes at least one of monoethanolamine (MEA), diethanolamine (DEA), triethanolamine (TEA), or methyldiethanolamine (MDEA); or (4) adding at least 5 wt % and at most 30 wt % of a ketone to the odorant fraction, where the ketone includes at least one of di-isobutyl ketone, acetone, or methyl ethyl ketone (MEK).

DESCRIPTION OF THE DRAWINGS

The advantages of the present techniques may become apparent upon reviewing the following detailed description and drawings of non-limiting examples, in which.

It should be noted that the figures are merely examples of the present techniques, and no limitations on the scope of the present techniques are intended thereby.

DETAILED DESCRIPTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

"Acid gas" refers to any gas that dissolves in water, producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof. Moreover, the term "sour natural gas stream," or simply "sour gas," refers to a natural gas stream that contains relatively high quantities of acid gas components.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "around" means a relative amount of a material or characteristic that is sufficient to provide the intended effect. The exact degree of deviation allowable in some cases may depend on the specific context, e.g., ±1%, ±5%, ±10%, ±15%, etc. It should be understood by those skilled in the art that this term is intended to allow a description of certain features described and claimed without restricting the scope of these features to the precise numerical ranges provided. Accordingly, this term should be interpreted as indicating that insubstantial or inconsequential modifications or alterations of the subject matter described are considered to be within the scope of the disclosure.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The term "disulfide" or "disulfide compound" refers to a chemical compound of the general form R—S—S—R'. Examples of disulfide compounds includes dimethyl disulfide (DMDS or $H_3CSSCH_3$), diaryl disulfide (DADS), and carbon disulfide.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing subterranean formations. Note that the terms "formation," "reservoir," and "interval" may be used interchangeably, but may generally be used to denote progressively smaller subsurface regions, zones, or volumes. More specifically, a "formation" may generally be the largest subsurface region, while a "reservoir" may generally be a hydrocarbon-bearing zone or interval within the geologic formation that includes a relatively high percentage of oil and gas.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas and oil. Moreover, the term "hydrocarbon" may refer to components found in raw natural gas, such as methane ($CH_4$), ethane ($C_2H_6$), $C_3$ isomers, $C_4$ isomers, benzene, and the like.

"Lactate ester solvents" are a group of "green," i.e., environmentally-friendly, solvents that are non-toxic and readily biodegradable. Examples of lactate ester solvents are ethyl lactate and methyl lactate, both of which belong to the lactate ester group of compounds. Ethyl lactate, also known as lactic acid ethyl ester, is a monobasic ester formed from lactic acid and ethanol. Similarly, methyl lactate, also known as lactic acid methyl ester, is a monobasic ester formed from lactic acid and methanol. Both ethyl lactate and methyl lactate react with water to form lactic acid (and ethanol or methanol, respectively).

The term "oxidizer" (or "oxidizing agent") refers to a substance that has the ability to oxidize another substance or, in other words, to undergo a chemical reaction in which it gains one or more electrons from the other substance. Stated more simply, an oxidizer is one component in an oxidation-reduction (redox) reaction. According to embodiments described herein, oxygen may be utilized as the oxidizer. However, those skilled in the art will appreciate that other suitable oxidizers may alternatively be utilized.

As used herein, the term "permeability" refers to the capacity of a material to allow fluids to pass through it. Permeability may be measured using Darcy's Law: $Q=(k \Delta P A)/(\mu L)$, where $Q$=flow rate (cm$^3$/s), $\Delta P$=pressure drop (atm) across a cylinder having a length L (cm) and a cross-sectional area A (cm$^2$), $\mu$=fluid viscosity (cp), and k=permeability (Darcy). The customary unit of measurement for permeability is the millidarcy (mD). When the term "permeability" is used herein with reference to a formation, or an interval of a formation, it refers to the capacity of the formation to transmit fluids through the interconnected pore spaces of the rock.

As used herein, the term "solvent" refers to a fluid (typically in liquid phase) that preferentially absorbs one component over another, while the term "solvent mixture" refers to some combination of solvents that preferentially absorb one component over another. According to embodiments described herein, the term "solvent mixture" generally refers to a mixture of solvents that are capable of preferentially absorbing elemental sulfur.

As used herein, the term "stimulation" refers to the process of treating a hydrocarbon-bearing formation to increase the production rate of hydrocarbons from the formation. While many different techniques are used to stimulate a formation, the term "stimulation" is primarily used herein in reference to the process of "acid stimulation." Acid stimulation involves treating a formation with a fluid containing a reactive acid, which increases the permeability of the formation.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

As used herein, the term "subsurface" refers to geologic strata occurring below the earth's surface, while the term "surface" refers to the uppermost land surface of a land well, or the mud line of an offshore well. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing, production tubing, and other equipment that is located inside the wellbore. Moreover, according to embodiments described herein, the terms "downhole" and "subsurface" are sometimes used interchangeably. More specifically, the term "downhole" is used to refer to the inside of the wellbore.

The term "thiol" refers to an organosulfur compound of the form R—SH, meaning that thiols contain a functional group that is composed of a sulfur atom and a hydrogen atom, which is referred to as a thiol or sulfhydryl group (—SH). Thiols are sometimes referred to as "mercaptans" (or "methanethiols"). The simplest mercaptan is a colorless, foul-smelling gas with the chemical formula $CH_3SH$. Because mercaptans have a distinctive, putrid odor, they are often added to natural gas as an odorant for safety and detection purposes.

The terms "well" and "wellbore" refer to holes drilled vertically, at least in part, and may also refer to holes drilled with deviated, highly deviated, and/or horizontal sections. The term also includes wellhead equipment, surface casing, intermediate casing, and the like, typically associated with oil and gas wells.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Overview

The present techniques relate to regenerating solvent mixtures that are used for downhole elemental sulfur removal and formation stimulation. More specifically, the present techniques relate to solvent mixtures that are capable of dissolving elemental sulfur that is deposited on well components, such as production tubing, within a hydrocarbon well, as well as stimulating a subsurface formation through which the hydrocarbon well extends. In contrast to typical solvents used for elemental sulfur removal, the solvent mixtures described herein are formulated to remove elemental sulfur from the well components without generating a significant volume of malodorous, or foul-smelling, gas. This is accomplished by utilizing the "white smell effect," which is described further herein.

According to embodiments described herein, the solvent mixture includes an elemental sulfur solvent fraction that includes at least one disulfide compound (such as dimethyl disulfide (DMDS)) and an odorant fraction that includes a lactate ester solvent (such as ethyl lactate). The solvent mixture may also include a number of additional components. For example, in various embodiments, the odorant fraction also includes a catalyst (such as methyldiethanolamine (MDEA)), a ketone (such as di-isobutyl ketone or methyl ethyl ketone), and/or other components. In addition, in various embodiments, water is added directly to the solvent mixture, and/or produced water flowing through the wellbores is allowed to react with the solvent mixture.

In various embodiments, as the solvent mixture is circulated throughout the wellbore to allow for the removal of element sulfur deposits from the well components (and, optionally, to stimulate the corresponding formation), the solvent mixture picks up thiols (e.g., mercaptans) that are present within the wellbore. According to embodiments described herein, the resulting spent solvent mixture is then recirculated back to the surface, where it is collected within a spent solvent separator, which may include any suitable holding-type pressure vessel or surge drum. Within the spent solvent separator, the spent solvent mixture is heated to a suitable temperature and sparged with an oxidizer (e.g., oxygen) for a suitable amount of time to allow for the regeneration of at least a portion of the disulfide compound(s) within the element sulfur solvent fraction via chemical reaction between the thiols and the lactate ester solvent (e.g. ethyl lactate) present within the spent solvent mixture, as described further herein. In various embodiments, this results in the production of disulfide compounds, which can then be used to regenerate the solvent mixture.

Composition of Solvent Mixture and Explanation of White Smell Effect

The solvent mixture described herein includes an elemental sulfur solvent fraction and an odorant fraction. The elemental sulfur solvent fraction includes an elemental sulfur solvent having and/or exhibiting a solvent odor. The elemental sulfur solvent fraction also has and/or exhibits a solvent sulfur solubility, which is the solubility of elemental sulfur within the elemental sulfur solvent. The odorant fraction includes at least one odorant having an odorant odor that differs from the solvent odor of the elemental sulfur solvent. The mixture odor differs from the solvent odor and also may differ from the odorant odor.

According to embodiments described herein, the odorant fraction, or presence of the odorant within the solvent mixture, improves the mixture odor, or a mixture odor perceived by an individual who smells the solvent mixture, when compared to the solvent odor, or a solvent odor perceived by an individual who smells the elemental sulfur solvent. As an example, the presence of the odorant fraction within the solvent mixture may decrease an intensity, or a perceived intensity, of the mixture odor relative to the solvent odor. As another example, the presence of the odorant fraction may decrease an offensiveness, or a perceived offensiveness, of the mixture odor relative to the solvent odor. This decrease in intensity and/or offensiveness of the mixture odor, when compared to the solvent odor, may be accomplished via a variety of distinct and/or cooperative mechanisms.

As an example, the addition of the odorant fraction to the elemental sulfur solvent fraction may cause the resulting solvent mixture to have a pleasant, or at least a more pleasant, mixture odor when compared to the solvent odor. Expressed in different terms, the addition of the odorant fraction to the elemental sulfur solvent fraction may cause the resulting solvent mixture to have a less offensive and/or less malodorous mixture odor when compared to the solvent odor of the elemental sulfur solvent by itself. As another example, the odorant fraction may be selected to have and/or to exhibit a number of distinct odors and/or to provide the number of distinct odors to the solvent mixture. Under these conditions, the addition of the odorant fraction to the elemental sulfur solvent fraction may cause the resulting mixture odor to include a variety, or a wide variety, of distinct odors, the combination of which may confuse and/or otherwise overwhelm olfactory organs of the individual who smells the solvent mixture, thereby causing the perceived intensity and/or the perceived offensiveness of the mixture odor to be less than the perceived intensity and/or the perceived offensiveness of the solvent odor. Such an effect may be referred to herein as a "white smell effect" and/or as a "white smell odor." Similar to white light and/or white noise, the white smell odor may be less distinctive, intense, and/or offensive to the user who smells the solvent mixture when compared to one or more of the individual odors that make up the white smell odor, and especially the solvent odor.

The intensity of the mixture odor and/or the decrease in the intensity of the mixture odor relative to the solvent odor may be measured and/or quantified in any suitable manner. For example, the presence of the odorant fraction may decrease a perceived intensity of the mixture odor, relative to the solvent odor, by at least 1, by at least 2, by at least 3, by at least 4, and/or by at least 5 on an Odor Intensity Referencing Scale. Examples of Odor Intensity Referencing Scales are defined by ASTM E544-99.

The offensiveness of the mixture odor and/or the decrease in the offensiveness of the mixture odor relative to the solvent odor may be measured and/or quantified in any suitable manner. As an example, the presence of the odorant fraction may decrease a perceived offensiveness of the mixture odor, relative to the solvent odor, by at least 1, by at least 2, by at least 3, by at least 4, and/or by at least 5 on an Odor Offensiveness Referencing Scale. Such Odor Offensiveness Referencing Scales are generally subjective in nature and typically utilize panelists to rank odors on a scale of 0 to 10, with 0 indicating that the odor is not offensive and 10 indicating that the odor is very offensive.

The elemental sulfur solvent fraction may have at least a threshold, or minimum, solvent sulfur solubility. Examples of the threshold solvent sulfur solubility include solubilities of 10 weight percent (wt %), 15 wt %, 20 wt %, 30 wt %, 40 wt %, 50 wt %, 60 wt %, 70 wt %, 80 wt %, 90 wt %, 100 wt %, 110 wt %, 120 wt %, 130 wt %, 140 wt %, and/or 150 wt %. The threshold solvent sulfur solubility may be measured, established, and/or determined at standard temperature and pressure (STP).

The solvent mixture may include any suitable amount, fraction, and/or percentage of the elemental sulfur solvent. As examples, the elemental sulfur solvent fraction may form, define, be made of, and/or constitute at least 20 wt %, at least 30 wt %, at least 40 wt %, at least 50 wt %, at least 60 wt %, and/or at least 70 wt % of the solvent mixture. Additionally or alternatively, the elemental sulfur solvent fraction may form, define, be made of, and/or constitute at most 80 wt %, at most 70 wt %, at most 60 wt %, at most 50 wt %, at most 40 wt %, and/or at most 30 wt % of the solvent mixture.

In some embodiments, the elemental sulfur solvent fraction is a single-component elemental sulfur solvent fraction that includes, consists of, or consists essentially of a single elemental sulfur solvent. In other embodiments, the elemental sulfur solvent fraction is a multi-component elemental sulfur solvent fraction that includes, consists of, or consists essentially of a number of elemental sulfur solvents, such as at least 2, at least 3, or at least 4 different elemental sulfur solvents.

According to embodiments described herein, the elemental sulfur solvent fraction includes a disulfide compound. Most preferably, the disulfide compound is dimethyl disulfide (DMDS), although other disulfide compounds, such as diaryl disulfide (DADS) and/or carbon disulfide may additionally or alternatively be used. In some embodiments, the elemental sulfur solvent fraction may also include any other suitable elemental sulfur solvent(s). For example, the elemental sulfur solvent fraction may additionally include methanol, isopropanol, diethanolamine (DEA), acetone, toluene, and/or an organic elemental sulfur solvent, depending on the details of the specific implementation.

As described herein, DMDS is an effective elemental sulfur solvent. However, the solvent odor of DMDS often precludes practical utilization of pure, or at least substantially pure, DMDS as an elemental sulfur solvent. However, according to embodiments described herein, the addition of the odorant fraction to a solvent mixture that includes DMDS generates a mixture odor that permits the solvent mixture to be utilized as an elemental sulfur solvent. DMDS also has other properties that are improved by the addition of the odorant fraction to generate the solvent mixture. For example, the solvent sulfur solubility of DMDS may be up to 115 wt %. However, when high concentrations of elemental sulfur are dissolved in DMDS, the resultant loaded solvent mixture, or sulfur-solvent mixture, may have a high viscosity and/or may clog filters. As described further herein, the addition of the odorant fraction to the solvent mixture decreases the viscosity of the solvent mixture and decreases the solvent sulfur solubility of the solvent mixture that includes DMDS relative to pure DMDS, thereby decreasing the potential for complications with filtering and/or conveyance of the loaded solvent mixture.

In some embodiments, the elemental sulfur solvent fraction includes a mixture of elemental sulfur solvents, in addition to the one or more disulfide compounds. One such mixture is marked under the trade name Brenntag 9597™ and includes 30-60 wt % DEA, 30-60 wt % methanol, 10-30 wt % acetone, and 5-10 wt % isopropanol.

In some embodiments, the elemental sulfur solvent fraction (and/or the solvent mixture that includes the elemental sulfur solvent fraction) has, or is selected to have, specified flammability properties. As an example, the elemental sulfur solvent fraction (and/or the solvent mixture that includes the elemental sulfur solvent fraction) may be inflammable, or at least substantially inflammable. As another example, the elemental sulfur solvent fraction (and/or the solvent mixture that includes the elemental sulfur solvent fraction) may have at least a threshold lower flammability limit in air. Examples of the threshold lower flammability limit include thresholds of 10 volume percent (vol %), 20 vol %, 30 vol %, 40 vol %, 50 vol %, 60 vol %, 70 vol %, 80 vol %, and/or 90 vol %.

In some embodiments, the elemental sulfur solvent fraction (and/or the solvent mixture that includes the elemental sulfur solvent fraction) has less than a threshold viscosity. Examples of the threshold viscosity include viscosities of 2 centipoise (cP), 4 cP, 6 cP, 8 cP, 10 cP, 15 cP, and/or 20 cP.

The solvent mixture may include any suitable amount, fraction and/or percentage of the odorant fraction. As examples, the solvent mixture may include at least 20 wt %, at least 30 wt %, at least 40 wt %, at least 50 wt %, at least 60 wt %, and/or at least 70 wt % of the odorant fraction. Additionally or alternatively, the solvent mixture may include at most 80 wt %, at most 70 wt %, at most 60 wt %, at most 50 wt %, at most 40 wt %, and/or at most 30 wt % of the odorant fraction.

In various embodiments, the odorant fraction is a multi-component odorant fraction that includes, consists of, or consists essentially of a number of odorants, such as at least 2, at least 3, or at least 4 different odorants. According to embodiments described herein, the odorant fraction includes a lactate ester solvent, such as ethyl lactate or methyl lactate. For example, the odorant fraction may include at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, or at least 50 wt % of a lactate ester solvent. Additionally or alternatively, the odorant fraction may include at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, and/or at most 50 wt % of a lactate ester solvent. For embodiments in which formation stimulation is desired, the lactate ester solvent is used to generate lactic acid via chemical reaction with water, as described further herein. Moreover, the lactate ester solvent contributes a fruity or lemony scent to the mixture odor, and increases, or improves, the compatibility of the solvent mixture with ethylene propylene diene monomer (EPDM) rubber, which may be utilized in the seals of a hydrocarbon well that utilizes the solvent mixture. Stated another way, the lactate ester solvent may decrease the potential for damage to the EDPM rubber due to contact with the solvent mixture.

In various embodiments, the odorant fraction also includes a catalyst, such as methyldiethanolamine (MDEA), to aid the reaction between the lactate ester solvent and water for embodiments in which formation stimulation is desired. For example, the odorant fraction may include at least 5 wt %, at least 6 wt %, at least 7 wt %, at least 8 wt %, at least 9 wt %, at least 10 wt %, at most 15 wt %, at most 14 wt %, at most 13 wt %, at most 12 wt %, and/or at most 11 wt % MDEA.

The odorant fraction may also include any other suitable odorant and/or odorants. For example, the odorant fraction may also include a ketone (e.g., di-isobutyl ketone, methyl ethyl ketone (MEK), and/or acetone), an amine (e.g., mono-ethanolamine (MEA), diethanolamine (DEA), and/or tri-ethanolamine (TEA)), an ester, an aromatic compound, and/or a sulfurous compound. Ketones, when utilized, may contribute a ketone, or butterscotch, scent to the mixture odor.

In various embodiments, the odorant fraction is miscible, or at least substantially miscible, with the elemental sulfur solvent fraction. In addition, the odorant fraction may be unreactive, or at least substantially unreactive, with and/or within the elemental sulfur solvent fraction. Furthermore, the elemental sulfur solvent fraction may be non-toxic, or at least substantially non-toxic.

In various embodiments, the elemental sulfur solvent fraction includes, consists of, or consists essentially of DMDS. In such embodiments, the elemental sulfur solvent fraction may include at least 20 wt % DMDS, at least 22 wt % DMDS, at least 24 wt % DMDS, at least 26 wt % DMDS, at least 28 wt % DMDS, and/or at least 30 wt % DMDS. Additionally or alternatively, the elemental sulfur solvent fraction may include at most 40 wt % DMDS, at most 38 wt % DMDS, at most 36 wt % DMDS, at most 34 wt % DMDS, at most 32 wt % DMDS, and/or at most 30 wt % DMDS.

In such embodiments, the odorant fraction may include, consist of, or consist essentially of acetone, MEK, and ethyl lactate. The odorant fraction may include at least 5 wt %, at least 6 wt %, at least 7 wt %, at least 8 wt %, at least 9 wt %, and/or at least 10 wt % acetone. Additionally or alternatively, the odorant fraction may include at most 15 wt %, at most 14 wt %, at most 13 wt %, at most 12 wt %, at most 11 wt %, and/or at most 10 wt % acetone. In addition to contributing the ketone, or butterscotch, odor to the mixture odor, the acetone may function as a wetting agent to improve sulfur uptake, or a rate of sulfur uptake, into the solvent mixture. The acetone additionally or alternatively may reduce the viscosity of the solvent mixture when compared to the viscosity of DMDS, especially after dissolution of elemental sulfur within the solvent mixture. The acetone additionally or alternatively may increase, or improve, a compatibility of the solvent mixture with EPDM rubber.

In such embodiments, the odorant fraction may include at least 10 wt %, at least 12 wt %, at least 14 wt %, at least 16 wt %, at least 18 wt %, and/or at least 20 wt % MEK. Additionally or alternatively, the odorant fraction may include at most 30 wt %, at most 28 wt %, at most 26 wt %, at most 24 wt %, at most 22 wt %, and/or at most 20 wt % MEK. Similar to acetone, the MEK may contribute the ketone, or butterscotch, odor to the mixture odor, may function as a wetting agent to improve sulfur uptake, or a rate of sulfur uptake, into the solvent mixture, may reduce the viscosity of the solvent mixture when compared to the viscosity of DMDS, especially after dissolution of elemental sulfur within the solvent mixture, and/or may increase, or improve, the compatibility of the solvent mixture with EPDM rubber.

In this embodiment, as well as in the other embodiments of solvent mixtures that are disclosed herein, the odorant fraction may include at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, or at least 50 wt % ethyl lactate. Additionally or alternatively, the odorant fraction may include at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, and/or at most 50 wt % ethyl lactate.

In addition to the above, the odorant fraction such embodiments may also include an amine. The odorant fraction may include at least 3 wt %, at least 4 wt %, at least 5 wt %, at least 6 wt %, at least 7 wt %, at least 8 wt %, at least 9 wt %, at least 10 wt %, at least 11 wt %, and/or at least 12 wt % of the amine. Additionally or alternatively, the odorant fraction may include at most 22 wt %, at most 21 wt %, at most 20 wt %, at most 19 wt %, at most 18 wt %, at most 17 wt %, at most 16 wt %, at most 15 wt %, at most 14 wt %, at most 13 wt %, and/or at most 12 wt % of the amine. The DMDS may outgas hydrogen sulfide, and the amine may sequester the $H_2S$ within the solvent mixture. When the solvent mixture includes the amine, ketones (such as acetone, di-isobutyl ketone, and/or MEK), may be included in the solvent mixture to mask a smell of the amine.

In some embodiments, the amine may include, consist of, or consist essentially of MEA and/or DEA. In this more specific embodiment, the odorant fraction may include at least 0.1 wt %, at least 0.2 wt %, at least 0.3 wt %, and/or at least 0.4 wt % MEA. Additionally or alternatively, the odorant fraction may include at most 0.1 wt %, at most 0.2 wt %, at most 0.3 wt %, and/or at most 0.4 wt % MEA. The MEA may increase a rate of sulfur uptake within the solvent mixture by serving as a catalyst for the DMDS, may provide corrosion protection for metals, such as carbon steel, that contact the solvent mixture, and/or may improve, or increase, the compatibility of the solvent mixture with EPDM rubber.

In such embodiments, the odorant fraction also may include at least 0.1 wt %, at least 0.2 wt %, at least 0.3 wt %, at least 0.4 wt %, at least 0.5 wt % and/or at least 0.6 wt % DEA. Additionally or alternatively, the odorant fraction may include at most 0.6 wt %, at most 0.5 wt %, at most 0.4 wt %, at most 0.3 wt %, at most 0.2 wt % and/or at most 0.1 wt % DEA. The DEA may increase a selectivity of the solvent mixture to dissolve and/or retain elemental sulfur and/or hydrogen sulfide, may provide corrosion protection for metals, such as carbon steel, that contact the solvent mixture, may improve, or increase, the compatibility of the solvent mixture with EPDM rubber, and/or may decrease hydrogen sulfide generation and/or outgassing from the solvent mixture, especially at lower temperatures.

In other embodiments, the amine may include, consist of, or consist essentially of TEA. In this more specific embodiment, as well as in the other embodiments of solvent mixtures that are disclosed herein, the odorant fraction may include at least 5 wt %, at least 6 wt %, at least 7 wt %, at least 8 wt %, at least 9 wt %, and/or at least 10 wt % TEA. Additionally or alternatively, the odorant fraction may include at most 5 wt %, at most 6 wt %, at most 7 wt %, at most 8 wt %, at most 9 wt %, and/or at most 10 wt % TEA.

As described herein, the presence of the odorant fraction within the solvent mixture may decrease a mixture sulfur solubility of elemental sulfur within the solvent mixture as compared to the solvent sulfur solubility. Stated another way, the mixture sulfur solubility may be less than the solvent sulfur solubility. In various embodiments, this decrease in sulfur solubility is desirable because it decreases a viscosity of the solvent mixture when sulfur is dissolved in the solvent mixture, and/or decreases a potential for clogging of filters by the solvent mixture when sulfur is dissolved within the solvent mixture.

The mixture sulfur solubility may be any suitable fraction, or percentage, of the solvent sulfur solubility. For example, the mixture sulfur solubility may be at least 10%, at least 20%, at least 30%, at least 40%, at least 50%, at least 60%, at least 70%, and/or at least 80% of the solvent sulfur solubility. Additionally or alternatively, the mixture sulfur solubility may be at most 90%, at most 80%, at most 70%, at most 60%, at most 50%, at most 40%, and/or at most 30% of the solvent sulfur solubility.

In some embodiments, the odorant fraction may be selected such that the solvent mixture has a target, or desired, mixture sulfur solubility. Examples of the target mixture sulfur solubility include solubilities of at least 10 wt %, at least 20 wt %, at least 30 wt %, at least 40 wt %, at least 50 wt %, at least 60 wt %, at least 70 wt %, and/or at least 80 wt %. Additionally or alternatively, the target mixture sulfur solubility may be at most 90 wt %, at most 80 wt %, at most 70 wt %, at most 60 wt %, at most 50 wt %, at most 40 wt %, and/or at most 30 wt %.

In some embodiments, the elemental sulfur solvent fraction and/or the odorant fraction is selected such that the solvent mixture is compatible with, does not degrade, and/or does not swell elastomeric seals, such as EPDM seals. Additionally or alternatively, the elemental sulfur solvent fraction and/or the odorant fraction may be selected such that the solvent mixture is not corrosive to metals, such as carbon steel. Additionally or alternatively, the elemental sulfur solvent fraction and/or the odorant fraction may be selected such that the solvent mixture is not flammable or has greater than a threshold lower flammability limit, examples of which are described herein.

As described further herein, the lactate ester solvent within the solvent mixture reacts with water to form lactic acid, which may be used for formation stimulation. Therefore, according to embodiments described herein, the elemental sulfur solvent fraction and/or the odorant fraction are selected such that the solvent mixture is compatible with water and/or dissolves elemental sulfur in the presence of water. In various embodiments, at least some amount of water is added directly to the solvent mixture. For example, the solvent mixture may include at least 5 wt %, at least 6 wt %, at least 7 wt %, at least 8 wt %, at least 9 wt %, at least 10 wt %, at most 20 wt % water, at most 19 wt % water, at most 18 wt %, at most 17 wt %, at most 16 wt %, and/or at most 15 wt % water. Moreover, the solvent mixture may be formulated to handle significant amounts of additional water, to dissolve elemental sulfur in the presence of, or while in fluid contact with, water, to be stable in the presence of, or while in fluid contact with, water, and/or to retain dissolved elemental sulfur in the presence of, or while in fluid contact with, water. This may include retaining the dissolved elemental sulfur while in the presence of, while in fluid contact with, and/or while mixed with water for at least a threshold water contact time. Examples of the threshold water contact time include at least 1 hour, at least 4 hours, at least 8 hours, at least 12 hours, at least 16 hours, at least 20 hours, at least 24 hours, at least 36 hours, and/or at least 48 hours.

In preferred embodiments, the elemental sulfur solvent fraction includes around 30 wt % DMDS, which is used to remove elemental sulfur from downhole well components, such as the production tubing. In such preferred embodiments, the odorant fraction includes around 10 wt % MDEA, which is used as a catalyst to speed up the reaction of DMDS and elemental sulfur, as well as the reaction of ethyl lactate and water. The MDEA may also act as a corrosion inhibitor and increase the capability of DMDS with EPDM seals for continuous injection. In such preferred embodiments, the odorant fraction also includes around 10 wt % di-isobutyl ketone, which is used as a wetting agent to create a better contact angle between the DMDS and the elemental sulfur for uptake purposes. The di-isobutyl ketone also helps to decrease the odor of the DMDS via the white smell effect, reduces the viscosity of the DMDS after sulfur uptake, and increases the compatibility of DMDS with EPDM seals for continuous injections. The di-isobutyl ketone may also be replaced with around 5 wt % MEK and around 5 wt % acetone for a less expensive alternative. In addition, in such preferred embodiments, the odorant fraction includes around 30 wt % ethyl lactate, which is used for in situ generation of lactic acid according to embodiments described herein. The ethyl lactate also helps to decrease the odor of the DMDS via the white smell effect and increases the compatibility of DMDS with EPDM seals for continuous injections. In addition, in such preferred embodiments, the solvent mixture includes around 20 wt % water. In such preferred embodiments, the resulting solvent mixture will not only effectively dissolve elemental sulfur but will also generate lactic acid via the reaction of ethyl lactate and water, as described further herein. Furthermore, the presence of the ethyl lactate within the solvent mixture enables the solvent mixture to be readily regenerated via oxidation of thiols within the spent solvent mixture exiting the wellbore, as described further herein.

It is to be understood that the solvent mixture is not limited to the specific embodiments described herein but, rather, may include any suitable portions, fractions, and/or percentages of the elemental sulfur solvent fraction and the odorant fraction. Moreover, the elemental sulfur solvent fraction may include any suitable elemental sulfur solvent(s) in addition to the disulfide compound(s), and the odorant fraction may include any suitable odorant(s) in addition to the lactate ester solvent(s).

In various embodiments, the solvent mixture is formed by combining the elemental sulfur solvent fraction and the odorant fraction in any suitable manner. For example, the elemental sulfur solvent fraction and the odorant fraction may be stirred together or mixed within a mixing vessel to form the solvent mixture. In embodiments in which water is also included within the solvent mixture, the water may be combined with the elemental sulfur solvent fraction and the odorant fraction in the same, or a similar, way.

Downhole Elemental Sulfur Removal and Formation Stimulation Using Solvent Mixture Described Herein The solvent mixture described herein may be used to remove elemental sulfur from many different types of hydrocarbon conveyance systems, such as hydrocarbon wells, hydrocarbon production facilities, and/or hydrocarbon conveyance conduits. However, embodiments described herein primarily relate to the downhole application of the solvent mixture. Specifically, embodiments described herein relate to using the solvent mixture to remove elemental sulfur from downhole well components, such as the production tubing. Embodiments described herein also relate to generating lactic acid from the solvent mixture and using the generated lactic acid to stimulate a hydrocarbon-bearing formation proximate to the wellbore.

The solvent mixture may be injected into the well in any suitable manner. For example, in some embodiments, the solvent mixture is first pumped through a hot oiler truck or a heat exchanger, which increases the temperature of the solvent mixture to at least 95° F., at least 100° F., at least 105° F., at least 110° F., or at least 120° F., depending on the details of the specific implementation. The heated solvent mixture may then be bullheaded or pumped from the hot oiler truck or heat exchanger down the wellbore via any number of existing valves and/or flanges already assigned to the well manifold.

Once the solvent mixture has traveled down the wellbore, the elemental sulfur solvent fraction within the solvent mixture dissolves elemental sulfur deposits on the well components, creating a loaded solvent mixture, or a sulfur-solvent mixture, that includes both the solvent mixture and at least a portion of the elemental sulfur dissolved, suspended, or retained therein.

As described herein, the presence of the odorant fraction within the solvent mixture reduces the intensity and/or the offensiveness of the mixture odor via the white smell effect. Furthermore, according to embodiments described herein, the lactate ester solvent within the odorant fraction provides for in situ generation of lactic acid within the well. For example, if the lactate ester solvent is ethyl lactate, it will react with water to form lactic acid and ethanol. Similarly, if the lactate ester solvent is methyl lactate, it will react with water to form lactic acid and methanol. In various embodiments, increasing the temperature of the solvent mixture before pumping the solvent mixture into the well aids in the hydrolysis of the lactate ester solvent. Moreover, in embodiments in which a catalyst, such as MDEA, is included in the odorant fraction, the catalyst will also increase the hydrolysis reaction rate.

In various embodiments, the resulting lactic acid will acidify the carbonate materials in the near-wellbore region of the formation. Such stimulation will increase the permeability of the formation, thus increasing the production rate of hydrocarbon fluids from the formation.

After the elemental sulfur removal and formation stimulation processes are complete, the resulting spent (or loaded) solvent mixture may be pumped back to the surface, where it may be collected within a spent solvent separator, as described further herein. In some embodiments, the solvent mixture may circulate all the way through the well completion and back to the surface relatively quickly. For example, the total circulation time may be less than 0.5 hour, less than 1 hour, less than 1.5 hours, less than 2 hours, less than 2.5 hours, or less than 4 hours, depending on the details of the specific implementation. This short circulation time, in combination with the relatively high temperature of the solvent mixture, helps to ensure that the solvent mixture does not drop out solubilized sulfur elsewhere in the formation or the well. In other words, the mixture sulfur solubility remains high enough to retain the elemental sulfur within the solution.

As described herein, some amount of water may be included within the solvent mixture. For example, the solvent mixture may include at least 5 wt %, at least 6 wt %, at least 7 wt %, at least 8 wt %, at least 9 wt %, at least 10 wt %, at most 20 wt % water, at most 19 wt % water, at most 18 wt %, at most 17 wt %, at most 16 wt %, and/or at most 15 wt % water. This may be particularly useful when the solvent mixture is being bullheaded into a shut-in well. In that case, the water within the solvent mixture will allow for the immediate generation of lactic acid. Then, when the well is put into production, the amount of water within the well will naturally increase, thus increasing the rate of acid generation.

In some embodiments, it may be desirable to improve, or decrease the intensity of, the loaded solvent mixture odor, while maintaining a sulfur solubility of the loaded solvent mixture and/or while retaining the elemental sulfur dissolved, suspended, and/or retained within the loaded solvent mixture. This may be accomplished by, for example, adding additional lactate ester solvent, such as ethyl lactate, to the loaded solvent mixture such that the lactate ester solvent defines an additional at least 1 wt %, at least 2 wt %, at least 3 wt %, at least 4 wt %, at least 5 wt %, at least 6 wt %, at most 10 wt %, at most 9 wt %, at most 8 wt %, at most 7 wt %, at most 6 wt %, and/or at most 5 wt % of the loaded solvent mixture.

The solvent mixture described herein provides unexpected results in terms of downhole elemental sulfur removal and formation stimulation. In particular, water is generally expected to decrease a solvent's sulfur solubility, which in turn decreases the solvent's uptake of elemental sulfur. However, because the solvent mixture described herein utilizes the hydrolysis reaction between lactate ester solvents and water to generate lactic acid, increasing quantities of water actually improve the performance of the solvent mixture. In other words, the solvent mixture described herein effectively utilizes the water within the well to generate lactic acid for formation stimulation. As a result, the solvent mixture serves a dual purpose by both removing elemental sulfur from downhole well components and stimulating a formation through which the well extends. Moreover, the lactate ester solvent provides an additional benefit by helping to reduce the intensity and/or the offensiveness of the mixture odor, making the solvent mixture a more useful and attractive solvent for elemental sulfur removal than typical elemental sulfur solvents.

Regeneration of Solvent Mixture Described Herein

In many cases, thiols (e.g., mercaptans) are present in locations where element sulfur has deposited on well components. Therefore, the spent solvent mixture that is flowed back out of the wellbore typically includes some amount of thiols, as well as residual lactate ester solvent (e.g., ethyl lactate) and various other components. Moreover, thiols are readily oxidized to disulfides via thiol sequestration by lactate ester solvent. Accordingly, embodiments described herein utilize this oxidation process to generate a variety of sulfur species, including disulfide compounds (e.g., DMDS), from the spent solvent mixture. Since disulfide compounds are the main component of the elemental sulfur solvent fraction of the solvent mixture described herein, generating such disulfide compounds in this manner allows the solvent mixture to be easily regenerated, recycled, and reused.

Turning now to the details of the regeneration process, in various embodiments, the spent solvent mixture is regenerated within a suitable holding-type pressure vessel or surge drum (generally referred to herein as a "spent solvent separator"). For example, in some embodiments a stainless-steel pressure vessel or surge drum is used to prevent corrosion.

In various embodiments, the temperature of the spent solvent mixture within the spent solvent separator is closely controlled to maximize the generation of disulfide compounds. In general, higher disulfide generation is achieved at higher temperatures. Therefore, in some embodiments, the spent solvent mixture may be maintained at relatively high temperatures of, for example, at least 120° F. and at most 200° F. In some embodiments, temperatures within a range between 140° F. and 180° F. are most preferable. Moreover, in some embodiments, the spent solvent separator is insulated and includes heat tracing capabilities, thus allowing the temperature within the spent solvent separator to be closely monitored and maintained, particularly during cold months.

In some embodiments, the spent solvent separator is also used as a one-pass heater to increase the injection temperature of the regenerated solvent mixture before it is reintroduced into the wellbore. In such embodiments, the regenerated solvent mixture may be injected into the hydrocarbon well in relatively small batches to allow the injection temperature to be further controlled. This may allow for higher sulfur uptake near the top of the wellbore, as well as a higher amount of lactic acid production for formation stimulation. This may be particularly beneficial for high-pressure systems that include large concentrations of acid gas (e.g., $H_2S$ and $CO_2$). Furthermore, this may allow the solvent mixture to be effectively used for multiple, smaller-scale treatment jobs within the wellbore, thus avoiding the necessity of performing time-consuming coiled-tubing workovers for such treatment jobs.

As part of the oxidation process, the spent solvent mixture is also exposed to an oxidizer, such as oxygen. In some embodiments, this is accomplished by directly injecting oxygen into the spent solvent separator such that the spent solvent mixture is sparged with oxygen during the regeneration process. Alternatively, for embodiments in which containment is not desired, a vat of the spent solvent mixture may be exposed to air within the atmosphere. However, due to the noxious odors of the compounds used for the process, containment is likely to be desired.

In some embodiments, the residual lactate ester solvent within the spent solvent mixture may not be sufficient for maximizing the oxidation process. In such embodiments, additional lactate ester solvent may be added to the spent solvent mixture within the spent solvent separator, thus furthering the oxidation process.

In operation, the spent solvent mixture may be sparged with the oxidizer within the spent solvent separator for a suitable amount of time to allow the oxidation process to progress. For example, in some embodiments, the spent solvent mixture is sparged for at least 1 hour and at most 4 hours, although the specific amount of time may vary considerably depending on the details of the specific implementation. Moreover, to maximize the contact time, the spent solvent mixture may be sparged at a relatively slow oxidizer injection rate of, for example, at least 0.1 m/s and at most 2.0 m/s.

Furthermore, in some embodiments, additional lactate ester solvent (e.g., ethyl lactate) and/or water is injected into the spent solvent mixture within the spent solvent separator to achieve a suitable combination of lactate ester solvent and water to further the oxidation process. In such embodiments, the amount of lactate ester solvent and/or water to inject may be determined while taking into consideration a desirable amount of water for the resulting regenerated solvent mixture. In general, it is desirable to achieve a balance of water and lactate ester solvent in addition to an optimum temperature and oxidation process that will promote appropriate hydrolysis and disulfide regeneration for solid sulfur deposition removal, reservoir stimulation via hydrolysis of lactate ester solvent to lactic acid, and thiol sequestration with residual and/or additional lactate ester solvent in the solution.

In various embodiments, a variety of sulfur species are generated via the thiol oxidation process described herein. Such sulfur species may include, for example, sulfides (such as hydrogen sulfide, dimethyl sulfide, di-iso-propyl sulfide, di-iso-butyl sulfide, and/or di-n-butyl sulfide), mercaptans (such as methyl mercaptan, ethyl mercaptan, pri-Amyl mercaptan, and/or n-Amyl mercaptan), and disulfides (such as dimethyl disulfide (DMDS)). Notably, field trials have demonstrated that the concentration of generated disulfides is relatively high as compared to the other generated sulfur species. For example, in some embodiments, DMDS may be regenerated with a yield of around 75% to 90%. This is highly desirable since disulfide compounds (e.g., DMDS) are the main component of the element sulfur solvent fraction of the solvent mixture.

Furthermore, in various embodiments, the resulting regenerated solvent mixture may have higher sulfur uptake capabilities than the original solvent mixture due to the manner in which the solvent mixture is regenerated. For example, in some cases, the regenerated solvent mixture may experience a 7-10 wt % increase in sulfur uptake capability as compared to the original solvent mixture. This may be due, in part, to the oxygen sparging performed using the spent solvent separator.

Methods for Utilizing and Regenerating Solvent Mixture Described Herein

Figure 1:
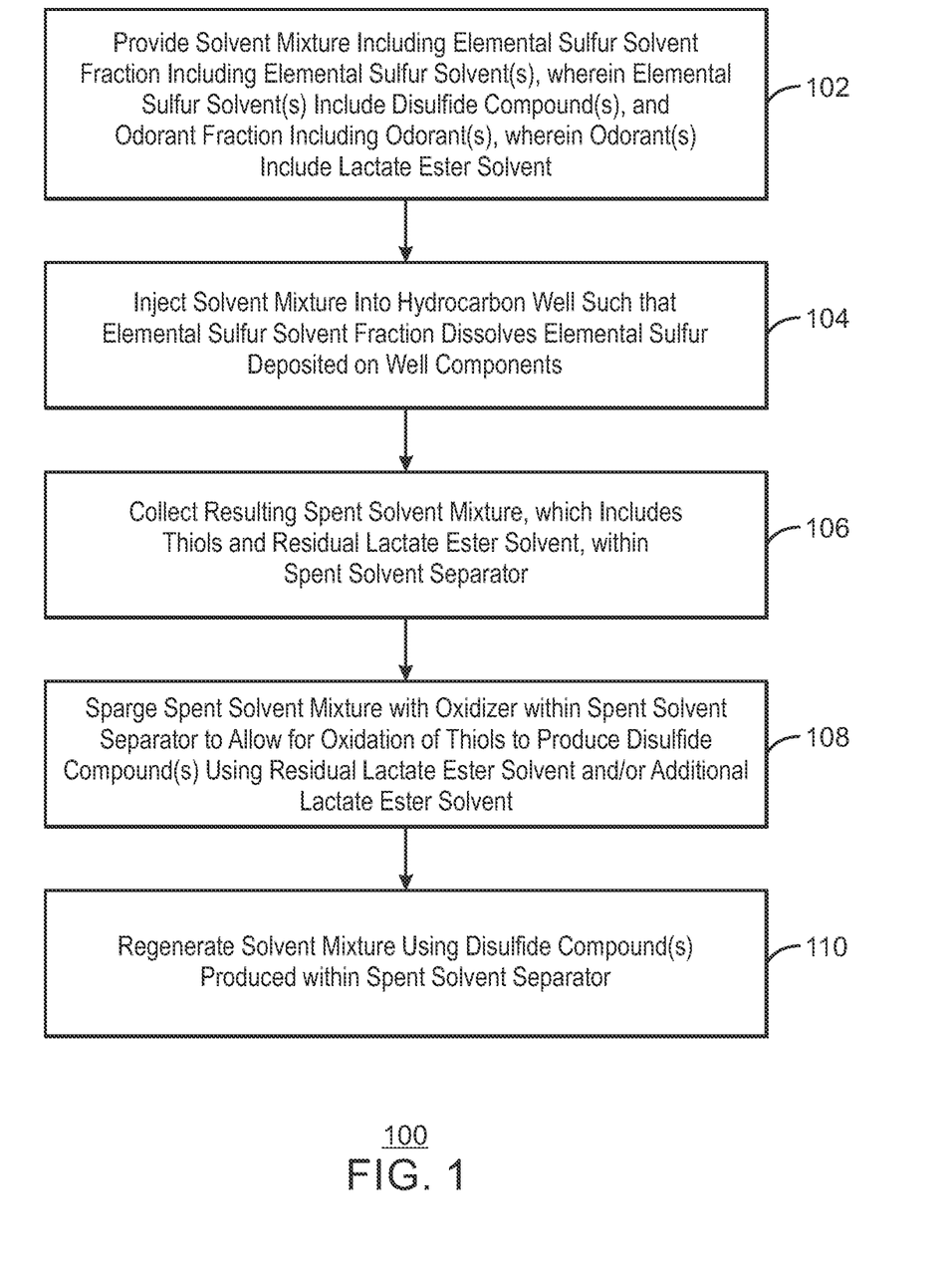
FIG. 1 is a process flow diagram of a method for utilizing a solvent mixture to dissolve elemental sulfur within a hydrocarbon well, as well as regenerating the solvent mixture.

FIG. 1 is a process flow diagram of a method 100 for utilizing a solvent mixture to dissolve elemental sulfur within a hydrocarbon well, as well as regenerating the solvent mixture. The method 100 begins at block 102, at which a solvent mixture including an elemental sulfur solvent fraction and an odorant fraction is provided. The elemental sulfur solvent fraction is composed of one or more elemental sulfur solvents, including one or more disulfide compounds, such as dimethyl disulfide (DMDS), diaryl disulfide (DRDS), and/or carbon disulfide ($CS_2$). For example, the elemental sulfur solvent fraction may include at least 20 wt % and at most 40 wt % DMDS. The odorant fraction is composed of one or more odorant(s), including at least 20 wt % and at most 70 wt % of a lactate ester solvent, such as ethyl lactate or methyl lactate. In addition, the elemental sulfur solvent fraction forms at least 20 wt % and at most 80 wt % of the solvent mixture, and the odorant fraction forms at least 20 wt % and at most 80 wt % of the solvent mixture, depending on the details of the specific implementation.

In some embodiments, providing the solvent mixture at block 102 includes combining the elemental sulfur solvent fraction with the odorant fraction. Moreover, in some embodiments, providing the solvent mixture at block 102 includes recirculating a regenerated solvent mixture produced at block 110. In this manner, the method 100 may be implemented as a cyclic process in which the solvent mixture is continuously (or intermittently) utilized, regenerated, and reused.

In various embodiments, the elemental sulfur solvent fraction of the solvent mixture includes a solvent odor and a solvent sulfur solubility of at least 10 wt % at STP, and the odorant fraction includes an odorant odor that differs from the solvent odor. Moreover, the presence of the odorant fraction within the solvent mixture decreases at least one of an intensity or an offensiveness of a mixture odor of the solvent mixture relative to the solvent odor.

In various embodiments, providing the solvent mixture at block 102 includes adding at least 5 wt % and at most 20 wt % water directly to the solvent mixture. In addition, in some embodiments, providing the solvent mixture includes increasing the temperature of the solvent mixture by flowing the solvent mixture through a hot oiler truck or a heat exchanger or, for embodiments in which the regenerated solvent mixture is used at block 102, by circulating the solvent mixture through the spent solvent separator before injecting the solvent mixture into the hydrocarbon well. Furthermore, providing the solvent mixture may include: (1) adding at least 5 wt % and at most 15 wt % of a catalyst, such as methyldiethanolamine (MDEA), to the odorant fraction of the solvent mixture; (2) adding methanol, isopropanol, diethanolamine (DEA), acetone, toluene, and/or an organic elemental sulfur solvent to the elemental sulfur solvent fraction in addition to the disulfide compound(s); (3) adding at least 3 wt % and at most 22 wt % of an amine, such as monoethanolamine (MEA), diethanolamine (DEA), triethanolamine (TEA), and/or methyldiethanolamine (MDEA), to the odorant fraction; and/or (4) adding at least 5 wt % and at most 30 wt % of a ketone, such as di-isobutyl ketone, acetone, and/or methyl ethyl ketone (MEK), to the odorant fraction.

In some embodiments, the mixture sulfur solubility of the elemental sulfur within the solvent mixture is at least 10% and at most 90% of the solvent sulfur solubility. Further, in some embodiments, the presence of the odorant fraction within the solvent mixture decreases the intensity of the mixture odor, relative to the solvent odor, by at least 1 on an Odor Intensity Referencing Scale, and/or decreases the offensiveness of the mixture odor, relative to the solvent odor, by at least 1 on an Odor Offensiveness Referencing Scale.

At block 104, the solvent mixture is injected into a hydrocarbon well such that the elemental sulfur solvent fraction of the solvent mixture dissolves elemental sulfur deposited on well components. In some embodiments, this includes flowing the solvent mixture through a production tubing of the hydrocarbon well such that the elemental sulfur solvent fraction of the solvent mixture dissolves elemental sulfur deposited on a wall of the production tubing. In addition, in some embodiments, the elemental sulfur solvent fraction may dissolve elemental sulfur deposited on various different well components. For example, the elemental sulfur solvent fraction may be used to dissolve elemental sulfur that is preventing one or more check valves from effectively closing, thereby unsticking such check valves. Furthermore, in some embodiments, the injection of the solvent mixture into the hydrocarbon well is followed by a hot water flush that causes at least a portion of the dissolved sulfur to fall down towards the bottom of the wellbore. In this manner, the dissolved sulfur is prevented from interfering with further wellbore operations.

At block 106, the resulting spent solvent mixture, which includes thiols (e.g., mercaptans) that were picked up as the mixture circulated through the wellbore as well as residual lactate ester solvent (e.g., ethyl lactate) remaining within solution, is collected within a spent solvent separator. In various embodiments, the spent solvent separator is any suitable holding-type pressure vessel or surge drum. For example, in some embodiments, a stainless-steel pressure vessel or surge drum is used to prevent corrosion. Moreover, in various embodiments, the spent solvent separator is insulated and includes heat tracing capabilities. This allows the temperature within the spent solvent separator to be closely monitored and maintained, particularly during winter months.

At block 108, the spent solvent mixture is sparged with an oxidizer (e.g., oxygen) within the spent solvent separator to allow for oxidation of thiols to produce disulfide compound(s) (e.g., including the disulfide compound(s) used within the elemental sulfur solvent fraction of the solvent mixture) via chemical reaction with the residual lactate ester solvent and/or additional lactate ester solvent. In some embodiments, this includes contacting the spent solvent mixture with the additional lactate ester solvent within the spent solvent separator to further the oxidation process. Furthermore, in various embodiments, this includes increasing the temperature of the spent solvent mixture within the spent solvent separator to, for example, at least 120° F. and at most 200° F. to further the oxidation process. In some embodiments, this is accomplished using one or more stainless-steel solvent heating coils within the spent solvent separator. In such embodiments, the method 100 may further include utilizing the spent solvent separator to increase the injection temperature of the solvent mixture at block 104 from ambient conditions to, for example, at least 120° F. and at most 200° F. using the stainless-steel solvent heating coil(s), as well as injecting the solvent mixture into the hydrocarbon well in batches with a shorter injection time for each batch, where the shorter injection times are enabled by the relatively high injection temperature of the solvent mixture. In some preferred embodiments, injection temperatures for the solvent mixture may range between 120° F. and 140° F.

In various embodiments, the spent solvent mixture is sparged with the oxidizer within the spent solvent separator for a time period of, for example, at least 1 hour and at most 4 hours to allow for the oxidation of the thiols to produce the disulfide compound(s). Moreover, in various embodiments, the spent solvent mixture is sparged with the oxidizer within the spent solvent separator at a relatively slow oxidizer injection rate of, for example, at least 0.1 m/s and at most 2.0 m/s.

At block 110, the solvent mixture is regenerated using at least a portion of the disulfide compound(s) produced within the spent solvent separator. In various embodiments, this includes reconstituting the solvent mixture by adding varying amounts of each component to achieve the solvent mixture described with respect to block 102 (or a suitable variation thereof) and then suitably combining or mixing the components together. The regenerated solvent mixture may then be reused within the hydrocarbon well and/or transported to a different site to be used for another application.

The process flow diagram of FIG. 1 is not intended to indicate that the steps of the method 100 are to be executed in any particular order, or that all of the steps of the method 100 are to be included in every case. Further, any number of additional steps not shown in FIG. 1 may be included within the method 100, depending on the details of the specific implementation.

Figure 2:
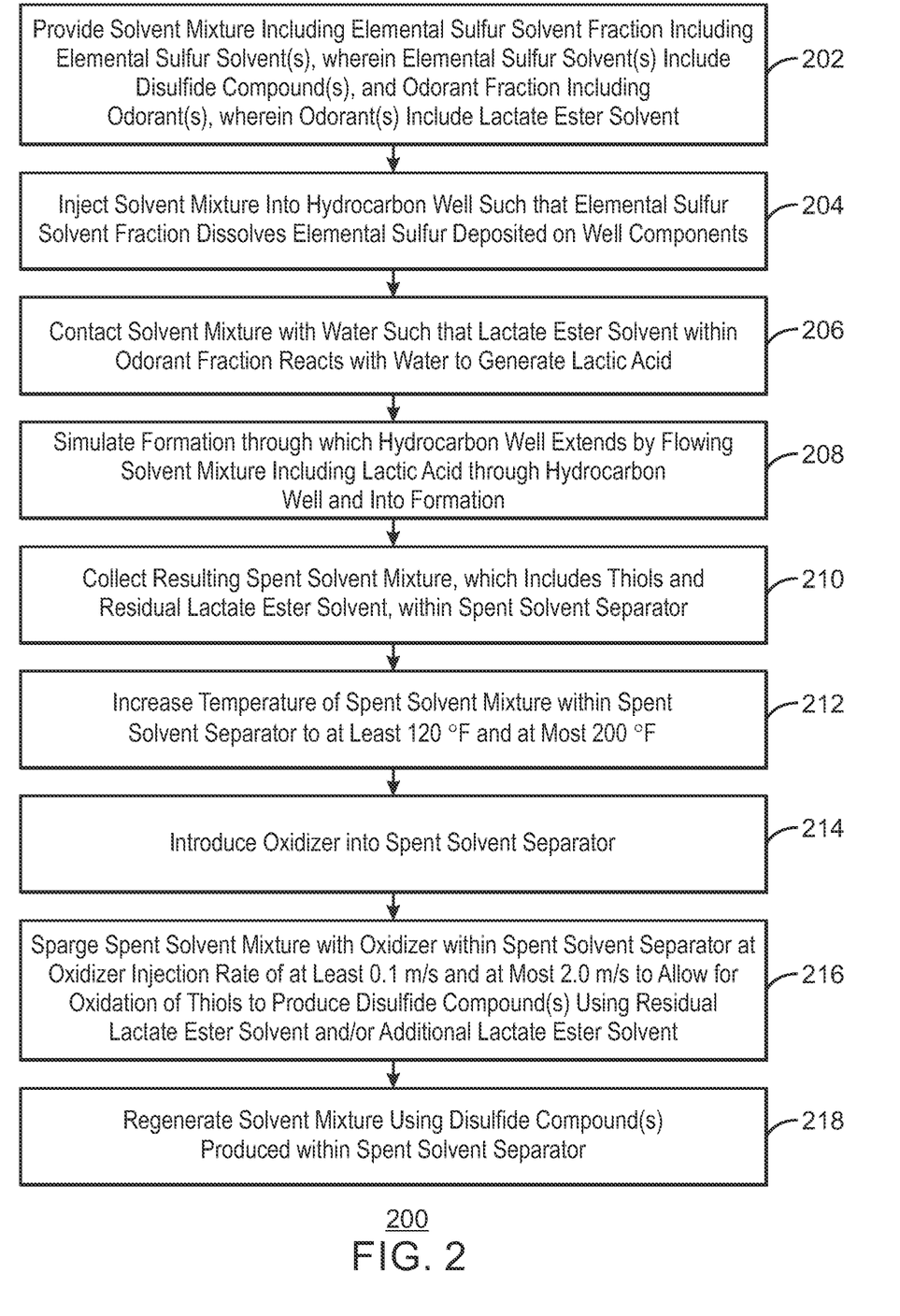
FIG. 2 is a process flow diagram of a method for utilizing a solvent mixture to dissolve elemental sulfur within a hydrocarbon well and stimulate a formation through which the hydrocarbon well extends, as well as regenerating the solvent mixture.

FIG. 2 is a process flow diagram of a method 200 for utilizing a solvent mixture to dissolve elemental sulfur within a hydrocarbon well and stimulate a formation through which the hydrocarbon well extends, as well as regenerating the solvent mixture. The method 200 begins at block 202, at which a solvent mixture including an elemental sulfur solvent fraction and an odorant fraction is provided. The elemental sulfur solvent fraction is composed of one or more elemental sulfur solvents, including a disulfide compound, such as dimethyl disulfide (DMDS), diaryl disulfide (DRDS), and/or carbon disulfide ($CS_2$). For example, the elemental sulfur solvent fraction may include at least 20 wt % and at most 40 wt % DMDS. The odorant fraction is composed of one or more odorant(s), including at least 20 wt % and at most 70 wt % of a lactate ester solvent, such as ethyl lactate or methyl lactate. In addition, the elemental sulfur solvent fraction forms at least 20 wt % and at most 80 wt % of the solvent mixture, and the odorant fraction forms at least 20 wt % and at most 80 wt % of the solvent mixture, depending on the details of the specific implementation.

In some embodiments, providing the solvent mixture at block 202 includes combining the elemental sulfur solvent fraction with the odorant fraction. Moreover, in some embodiments, providing the solvent mixture at block 202 includes recirculating a regenerated solvent mixture produced at block 218. In this manner, the method 200 may be implemented as a cyclic process in which the solvent mixture is continuously (or intermittently) utilized, regenerated, and reused.

In various embodiments, the elemental sulfur solvent fraction of the solvent mixture includes a solvent odor and a solvent sulfur solubility of at least 10 wt % at STP, and the odorant fraction includes an odorant odor that differs from the solvent odor. Moreover, the presence of the odorant fraction within the solvent mixture decreases at least one of an intensity or an offensiveness of a mixture odor of the solvent mixture relative to the solvent odor.

In various embodiments, providing the solvent mixture at block 202 includes adding at least 5 wt % and at most 20 wt % water directly to the solvent mixture. In addition, in some embodiments, providing the solvent mixture includes increasing the temperature of the solvent mixture by flowing the solvent mixture through a hot oiler truck or a heat exchanger or, for embodiments in which the regenerated solvent mixture is used at block 202, by circulating the solvent mixture through the spent solvent separator before injecting the solvent mixture into the hydrocarbon well. Furthermore, providing the solvent mixture may include: (1) adding at least 5 wt % and at most 15 wt % of a catalyst, such as methyldiethanolamine (MDEA), to the odorant fraction of the solvent mixture; (2) adding methanol, isopropanol, diethanolamine (DEA), acetone, toluene, and/or an organic elemental sulfur solvent to the elemental sulfur solvent fraction in addition to the disulfide compound(s); (3) adding at least 3 wt % and at most 22 wt % of an amine, such as monoethanolamine (MEA), diethanolamine (DEA), triethanolamine (TEA), and/or methyldiethanolamine (MDEA), to the odorant fraction; and/or (4) adding at least 5 wt % and at most 30 wt % of a ketone, such as di-isobutyl ketone, acetone, and/or methyl ethyl ketone (MEK), to the odorant fraction.

In some embodiments, the mixture sulfur solubility of the elemental sulfur within the solvent mixture is at least 10% and at most 90% of the solvent sulfur solubility. Further, in some embodiments, the presence of the odorant fraction within the solvent mixture decreases the intensity of the mixture odor, relative to the solvent odor, by at least 1 on an Odor Intensity Referencing Scale, and/or decreases the offensiveness of the mixture odor, relative to the solvent odor, by at least 1 on an Odor Offensiveness Referencing Scale.

At block 204, the solvent mixture is injected into a hydrocarbon well such that the elemental sulfur solvent fraction of the solvent mixture dissolves elemental sulfur deposited on well components. In some embodiments, this includes flowing the solvent mixture through a production tubing of the hydrocarbon well such that the elemental sulfur solvent fraction of the solvent mixture dissolves elemental sulfur deposited on a wall of the production tubing. In addition, in some embodiments, the elemental sulfur solvent fraction may dissolve elemental sulfur deposited on various different well components. For example, the elemental sulfur solvent fraction may be used to dissolve elemental sulfur that is preventing one or more check valves from effectively closing, thereby unsticking such check valves. Furthermore, in some embodiments, the injection of the solvent mixture into the hydrocarbon well is followed by a hot water flush that causes at least a portion of the dissolved sulfur to fall down towards the bottom of the wellbore. In this manner, the dissolved sulfur is prevented from interfering with further wellbore operations.

At block 206, the solvent mixture is contacted with water such that the lactate ester solvent within the odorant fraction reacts with the water to generate lactic acid. This may include allowing produced water flowing through the hydrocarbon well to react with the lactate ester solvent within the solvent mixture to generate the lactic acid. In addition, in embodiments in which water is added directly to the solvent mixture, this may include allowing the water within the solvent mixture to react with the lactate ester solvent within the solvent mixture to generate the lactic acid.

At block 208, a formation through which the hydrocarbon well extends is stimulated by flowing the solvent mixture including the lactic acid through the hydrocarbon well and into the formation. In various embodiments, the lactic acid acidifies carbonate materials within the formation, thus increasing the permeability of the formation. This, in turn, increases the production rate of hydrocarbon fluids from the formation.

At block 210, the resulting spent solvent mixture, which includes thiols (e.g., mercaptans) that were picked up as the mixture circulated through the wellbore as well as residual lactate ester solvent (e.g., ethyl lactate) remaining within solution, is collected within a spent solvent separator. In various embodiments, the spent solvent separator is any suitable holding-type pressure vessel or surge drum. For example, in some embodiments, a stainless-steel pressure vessel or surge drum is used to prevent corrosion. Moreover, in various embodiments, the spent solvent separator is insulated and includes heat tracing capabilities. This allows the temperature within the spent solvent separator to be closely monitored and maintained, particularly during winter months.

At block 212, the temperature of the spent solvent mixture within the spent solvent separator is increased at least 120° F. and at most 200° F. In various embodiments, this is accomplished using one or more stainless-steel solvent heating coils within the spent solvent separator. According to embodiments described herein, the degree of oxidation achieved at block 216 is based, at least in part, on the temperature of the spent solvent mixture within the spent solvent separator, with higher temperatures typically resulting in a higher degree of oxidation. Accordingly, in various embodiments, temperatures within a range between 140° F. and 180° F. are preferred.

In some embodiments, the method 200 also includes utilizing the spent solvent separator to maintain the injection temperature of the solvent mixture at block 204 at a relatively high injection temperature of, for example, at least 120° F. and at most 200° F. In such embodiments, the solvent mixture may be injected into the hydrocarbon well in batches with a shorter injection time for each batch, where the shorter injection times are enabled by the relatively high injection temperature of the solvent mixture. Moreover, in some preferred embodiments, injection temperatures for the solvent mixture may range between 120° F. and 140° F.

At block 214, an oxidizer is introduced (or injected) into the spent solvent separator. In some embodiments, the injected oxidizer is oxygen, although those skilled in the art will appreciate that any other suitable oxidizer may alternatively be used.

At block 216, the spent solvent mixture is sparged with the oxidizer within the spent solvent separator at a relatively slow oxidizer injection rate at least 0.1 m/s and at most 2.0 m/s to allow for oxidation of thiols to produce disulfide compound(s) (e.g., including the disulfide compound(s) used within the elemental sulfur solvent fraction of the solvent mixture) via chemical reaction with the residual lactate ester solvent and/or additional lactate ester solvent. In some embodiments, this includes contacting the spent solvent mixture with the additional lactate ester solvent (e.g., ethyl lactate) within the spent solvent separator to further the oxidation process. Moreover, in various embodiments, the spent solvent mixture is sparged with the oxidizer within the spent solvent separator for a time period of, for example, at least 1 hour and at most 4 hours to allow for the oxidation of the thiols to produce the disulfide compound(s). In some embodiments, additional lactate ester solvent is added and the sparging process is repeated for a time of, for example, at least 1 hour and at most 4 hours if spent solvent uptake with the residual lactate ester solvent needs to be improved or is less than around 20 wt % at a temperature of 180° F. and normal atmospheric conditions (with 0 wt % $H_2S$, 0 wt % $CO_2$).

At block 218, the solvent mixture is regenerated using at least a portion of the disulfide compound(s) produced within the spent solvent separator. In various embodiments, this includes reconstituting the solvent mixture by adding varying amounts of each component to achieve the solvent mixture described with respect to block 202 (or a suitable variation thereof) and then suitably combining or mixing the components together. The regenerated solvent mixture may then be reused within the hydrocarbon well and/or transported to a different site to be used for another application.

The process flow diagram of FIG. 2 is not intended to indicate that the steps of the method 200 are to be executed in any particular order, or that all of the steps of the method 200 are to be included in every case. Further, any number of additional steps not shown in FIG. 2 may be included within the method 200, depending on the details of the specific implementation.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method for utilizing and regenerating a solvent mixture for dissolving elemental sulfur within a hydrocarbon well, comprising:
   providing a solvent mixture, wherein the solvent mixture comprises:
      an elemental sulfur solvent fraction comprising at least one elemental sulfur solvent, wherein the at least one elemental sulfur solvent comprises at least one disulfide compound; and
      an odorant fraction comprising at least one odorant, wherein the at least one odorant comprises at least 20 wt % and at most 70 wt % of a lactate ester solvent;
      wherein the elemental sulfur solvent fraction forms at least 20 wt % and at most 80 wt % of the solvent mixture, and the odorant fraction forms at least 20 wt % and at most 80 wt % of the solvent mixture;
   injecting the solvent mixture into a hydrocarbon well such that the elemental sulfur solvent fraction of the solvent mixture dissolves elemental sulfur deposited on well components;
   collecting a resulting spent solvent mixture comprising thiols and residual lactate ester solvent within a spent solvent separator;
   sparging the spent solvent mixture with an oxidizer within the spent solvent separator to allow for oxidation of the thiols to produce the at least one disulfide compound using the residual lactate ester solvent; and
   regenerating the solvent mixture using at least a portion of the at least one disulfide compound produced within the spent solvent separator.

2. The method of claim 1, comprising contacting the spent solvent mixture with additional lactate ester solvent within the spent solvent separator to further the oxidation of the thiols to produce the at least one disulfide compound.

3. The method of claim 1, comprising increasing a temperature of the spent solvent mixture within the spent solvent separator to at least 120° F. and at most 200° F. to further the oxidation of the thiols to produce the at least one disulfide compound.

4. The method of claim 3, comprising insulating and heat tracing the spent solvent separator to maintain the temperature of the spent solvent mixture within the spent solvent separator.

5. The method of claim 1, comprising sparging the spent solvent mixture with the oxidizer within the spent solvent separator for a time period of at least 1 hour and at most 4 hours to allow for the oxidation of the thiols to produce the at least one disulfide compound.

6. The method of claim 1, comprising sparging the spent solvent mixture with the oxidizer within the spent solvent separator at a relatively slow oxidizer injection rate of at least 0.1 meters per second (m/s) and at most 2.0 m/s.

7. The method of claim 1, comprising:
   utilizing the spent solvent separator to maintain an injection temperature of the solvent mixture at a relatively high injection temperature of at least 120° F. and at most 200° F.; and
   injecting the solvent mixture into the hydrocarbon well in batches with a shorter injection time for each batch, wherein the shorter injection time is enabled by the relatively high injection temperature of the solvent mixture.

8. The method of claim 1, wherein providing the solvent mixture comprises combining the elemental sulfur solvent fraction with the odorant fraction; wherein the elemental sulfur solvent fraction comprises a solvent odor and a solvent sulfur solubility of at least 10 weight percent (wt %) at standard temperature and pressure (STP), and the odorant fraction comprises an odorant odor that differs from the solvent odor.

9. The method of claim 1, wherein providing the solvent mixture comprises adding at least 5 wt % and at most 20 wt % water directly to the solvent mixture.

10. The method of claim 1, wherein the lactate ester solvent comprises at least one of ethyl lactate or methyl lactate, and wherein the at least one disulfide compound comprises at least one of dimethyl disulfide (DMDS), diaryl disulfide (DRDS), or carbon disulfide ($CS_2$).

11. The method of claim 1, wherein providing the solvent mixture comprises at least one of:
   adding at least 5 wt % and at most 15 wt % of methyldiethanolamine (MDEA) to the odorant fraction;
   adding at least one of methanol, isopropanol, diethanolamine (DEA), acetone, toluene, or an organic elemental sulfur solvent to the elemental sulfur solvent fraction in addition to the at least one disulfide compound;
   adding at least 3 wt % and at most 22 wt % of an amine to the odorant fraction, wherein the amine comprises at least one of monoethanolamine (MEA), diethanolamine (DEA), triethanolamine (TEA), or methyldiethanolamine (MDEA); or
   adding at least 5 wt % and at most 30 wt % of a ketone to the odorant fraction, wherein the ketone comprises at least one of di-isobutyl ketone, acetone, or methyl ethyl ketone (MEK).

12. A method for utilizing and regenerating a solvent mixture for dissolving elemental sulfur within a hydrocarbon well and stimulating a formation through which the hydrocarbon well extends, comprising:
   providing a solvent mixture, wherein the solvent mixture comprises:
      an elemental sulfur solvent fraction comprising at least one elemental sulfur solvent, wherein the at least one elemental sulfur solvent comprises dimethyl disulfide (DMDS); and
      an odorant fraction comprising at least one odorant, wherein the at least one odorant comprises at least 20 wt % and at most 70 wt % of a lactate ester solvent;
      wherein the elemental sulfur solvent fraction forms at least 20 wt % and at most 80 wt % of the solvent mixture, and the odorant fraction forms at least 20 wt % and at most 80 wt % of the solvent mixture;
   injecting the solvent mixture into a hydrocarbon well such that the elemental sulfur solvent fraction of the solvent mixture dissolves elemental sulfur deposited on well components;
   contacting the solvent mixture with water such that the lactate ester solvent within the odorant fraction reacts with the water to generate lactic acid;
   stimulating a formation through which the hydrocarbon well extends by flowing the solvent mixture comprising the lactic acid through the hydrocarbon well and into the formation;
   collecting a resulting spent solvent mixture comprising thiols and residual lactate ester solvent within a spent solvent separator;
   increasing a temperature of the spent solvent mixture within the spent solvent separator to at least 120° F. and at most 200° F.;
   introducing an oxidizer into the spent solvent separator;

sparging the spent solvent mixture with the oxidizer within the spent solvent separator at an oxidizer injection rate of at least 0.1 meters per second (m/s) and at most 2.0 m/s to allow for oxidation of the thiols to produce DMDS using the residual lactate ester solvent; and regenerating the solvent mixture using at least a portion of the DMDS produced within the spent solvent separator.

13. The method of claim 12, comprising introducing additional lactate ester solvent into the spent solvent separator to further the oxidation of the thiols to produce the DMDS.

14. The method of claim 12, comprising increasing the temperature of the spent solvent mixture using at least one stainless-steel solvent heating coil within the spent solvent separator.

15. The method of claim 12, comprising sparging the spent solvent mixture with the oxidizer within the spent solvent separator for a time period of at least 1 hour and at most 4 hours to allow for the oxidation of the thiols to produce the DMDS.

16. The method of claim 12, comprising:
utilizing the spent solvent separator to maintain an injection temperature of the solvent mixture at a relatively high injection temperature of at least 120° F. and at most 200° F.; and
injecting the solvent mixture into the hydrocarbon well in batches with a shorter injection time for each batch, wherein the shorter injection time is enabled by the relatively high injection temperature of the solvent mixture.

17. The method of claim 12, comprising insulating and heat tracing the spent solvent separator to maintain the temperature of the spent solvent mixture within the spent solvent separator.

18. The method of claim 12, wherein contacting the solvent mixture with the water comprises at least one of:
adding at least 5 wt % and at most 20 wt % water directly to the solvent mixture and allowing the water within the solvent mixture to react with the lactate ester solvent within the solvent mixture to generate the lactic acid; or
allowing produced water flowing through the hydrocarbon well to react with the lactate ester solvent within the solvent mixture to generate the lactic acid.

19. The method of claim 12, wherein the lactate ester solvent comprises at least one of ethyl lactate or methyl lactate.

20. The method of claim 12, wherein providing the solvent mixture comprises at least one of:
adding at least 5 wt % and at most 15 wt % of methyldiethanolamine (MDEA) to the odorant fraction;
adding at least one of methanol, isopropanol, diethanolamine (DEA), acetone, toluene, or an organic elemental sulfur solvent to the elemental sulfur solvent fraction in addition to the DMDS;
adding at least 3 wt % and at most 22 wt % of an amine to the odorant fraction, wherein the amine comprises at least one of monoethanolamine (MEA), diethanolamine (DEA), triethanolamine (TEA), or methyldiethanolamine (MDEA); or
adding at least 5 wt % and at most 30 wt % of a ketone to the odorant fraction, wherein the ketone comprises at least one of di-isobutyl ketone, acetone, or methyl ethyl ketone (MEK).

* * * * *